United States Patent [19]

Struger et al.

[11] Patent Number: 5,297,257
[45] Date of Patent: Mar. 22, 1994

[54] DISTRIBUTING A REAL-TIME CONTROL PROGRAM TO A PLURALITY OF INPUT/OUTPUT NODES

[75] Inventors: Odo J. Struger, Chagrin Falls; Ernst Dummermuth, Chesterland, both of Ohio

[73] Assignee: Allen-Bradley Company, Inc., Milwaukee, Wis.

[21] Appl. No.: 686,054

[22] Filed: Apr. 15, 1991

[51] Int. Cl.$^5$ .............................................. G05B 19/05
[52] U.S. Cl. ............................. 395/200; 364/DIG. 1; 364/221.9; 364/222; 364/188
[58] Field of Search ................. 364/188, 200, 221.9, 364/222, 921.2, 921.3; 395/275

[56] References Cited

U.S. PATENT DOCUMENTS

| | | | |
|---|---|---|---|
| 4,443,861 | 3/1984 | Slater | 395/275 |
| 4,477,882 | 10/1984 | Schumacher et al. | 364/900 |
| 4,663,704 | 6/1987 | Jones | 364/188 |
| 4,858,101 | 8/1989 | Stewart et al. | 364/131 |
| 4,888,726 | 12/1989 | Struger et al. | 364/900 |
| 4,897,834 | 1/1990 | Peterson et al. | 370/85.1 |
| 4,937,777 | 6/1990 | Flood et al. | 364/900 |
| 4,972,365 | 11/1990 | Dodds et al. | 364/900 |

OTHER PUBLICATIONS

Morris, Henry M., "Distributed System Makes Wide Use of Bubble Memories", *Control Engineering*, Jan., 1982.

Houser, Kirk D., "Data Highway Provides Database Management", *Computer Design*, Nov., 1983.

"Integrated and Distributed Control—The Westinghouse Way", *The Yankee Group*, Boston, Mass., May 28, 1987.

Tanaka, et al., "Intermediate Functional Language FCL for Improving Software Portability of Programmable Controllers", (exact date unknown).

Schuur, C., "Token-Passing Field Bus Controller", *Philips Components*, Apr., 1989.

*Primary Examiner*—Gareth D. Shaw
*Assistant Examiner*—John J. B. Backenstose
*Attorney, Agent, or Firm*—Quarles & Brady

[57] ABSTRACT

A method for a distributed processing system which includes the steps of developing a control program for controlling outputs at a plurality of I/O nodes, distributing executable portions of the program to the I/O nodes through a network, broadcasting input status data from the I/O nodes on the network and controlling the outputs at the I/O nodes in response to the input status data broadcast on the network and the executable portions of the program residing at the I/O nodes.

6 Claims, 4 Drawing Sheets

DISTRIBUTING A REAL-TIME CONTROL PROGRAM TO A PLURALITY OF INPUT/OUTPUT NODES

BACKGROUND OF THE INVENTION

1. Field of the Invention

The field of the invention is digital controllers for controlling a machine, an assembly line or a commercial process. More particularly, the invention relates to programming terminals, distributed processing systems and communication networks.

2. Description of the Background Art

Programmable controllers are used in many industrial and commercial settings to control the operation of various machines and processes. They fall into the broad category of real-time sampled data systems. In a certain maximum time, inputs are read, controlling equations are applied, and actuator outputs are provided.

In U.S. Pat. No. 4,477,882, a group of small programmable controllers are connected in a ring network. A control program is set up and loaded into each respective controller.

While the programs are executing, the controllers communicate I/O image data, corresponding to the state of their inputs and outputs, in round-robin fashion. If eight controllers are in the ring, each controller puts its I/O image data on the network in one of the eight time slots. During the other seven time slots, each controller relays a set of image data from a neighboring controller on one side to a neighboring controller on the other side. The controllers each maintain an image of its own I/O image data as well as I/O image data for the other seven controllers in the ring. The update rate for each controller is limited to eight intervals which are required for all of the I/O image data to be communicated around the ring.

Another approach to communication of I/O data is disclosed in U.S. Pat. No. 4,897,834. There each network node broadcasts its input data on a repetitive basis. The other nodes are programmed to recognize the source address of the sending node and a bit of input data in the broadcast, and to control an output in response to this input data. However, the only type of control that can be exercised is a 1-to-1 mapping. If an input bit is true, then the output can be set true, or the NOT function can be performed: if an input bit is false, the output can be set true. There are no combinational logic functions performed at the I/O nodes. An output cannot be controlled in response to the AND function for two bits of input data.

Also, in U.S. Pat. No. 4,897,834, the mapping of the I/O nodes is accomplished by a direct connection of a programming device to each node. There is no downloading of mapping information through the broadcast network.

Flood et al., U.S. Pat. No. 4,937,777, discloses distribution of ladder control programs to separate processors connected through a rack backplane. Execution of these programs is linked through description files generated by a high-level sequential function chart program. I/O status data is collected by I/O scanners and is accessed in an image table, as needed, by the ladder control programs. The distribution of the ladder logic is essentially manual, the ladder program is set up first and then assigned to a controller by entering a controller ID number in a step of the sequential function chart.

All of these prior systems lacked the ability to distribute subdivisions of a ladder diagram program for execution at different nodes on a serial data network.

SUMMARY OF THE INVENTION

The invention relates to a method utilizing a personal computer to develop a control program for controlling outputs at a plurality of I/O nodes, distributing executable portions of the program to the I/O nodes through a network, broadcasting input status data from the I/O nodes on the network and controlling the outputs at the I/O nodes in response to the input status data broadcast on the network and the executable portions of the program residing at the I/O nodes.

More particularly, the plurality of I/O nodes includes a first I/O node for operating a first output to a controlled system and a second I/O node for operating a second output to a controlled system.

The method includes the step of connecting a logic programming node to the network; and within the logic programming node, the step of translating a control program from a higher-level logical programming language into a first portion corresponding to a first output controlled at the first I/O node, and into a second portion corresponding to a second output controlled at the second I/O node, wherein the control program logically relates the first and second outputs to logic states for relevant inputs communicating with the network.

The method further includes the step of communicating the first portion of the executable logic through the network to the first I/O node to operate the first output in response to logic states for the logically related inputs.

The method further includes the step of communicating the second portion of the executable logic through the network to the second I/O node to operate the second output in response to logic states for logically related inputs.

The method further includes the step of transmitting through the network to the first and second I/O nodes the logic states for the plurality of inputs, wherein each I/O node responds to the logic states for logically related inputs to control a respective one of the outputs connected to that I/O node.

In another a related aspect of the invention, the programming terminal monitors the execution of the program by updating a copy of the executable program and by listening to the inputs broadcast on the network and updating input and output status data.

Other objects and advantages, besides those discussed above, shall be apparent to those experienced in the art from the description of the preferred embodiment which follows. In the description, reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

DETAILED DESCRIPTION OF THE PREFERRED EMBODIMENTS

Figure 1:
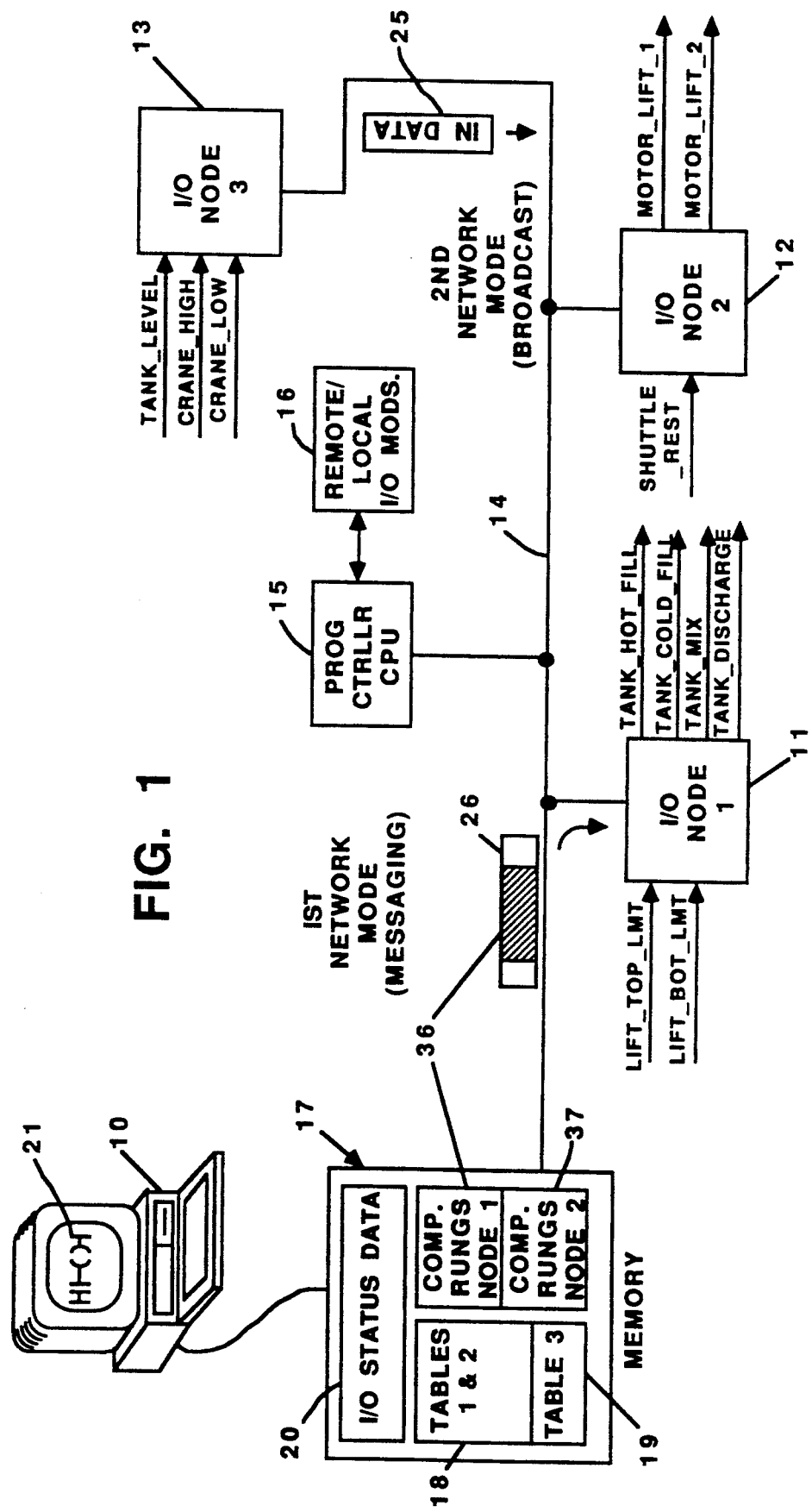
FIG. 1 is a system diagram of a distributed programmable controller including a programming computer and several I/O nodes connected by a network.

FIG. 1 shows a programming terminal 10, which is preferably an IBM PC/AT personal computer or an Allen-Bradley T-Series programming terminal with memory requirements and DOS operating system requirements as specified to run 6200 Series Software for PLC-5 TM programmable controllers. These requirements are specified in commercially available Allen-Bradley operating and instruction manuals, including the manual entitled "PLC-5 Programming Software", Copyright 1990 Allen-Bradley Company, Inc.

The programming terminal 10 is connected to a set of three I/O nodes 11, 12, 13 through a serial communication link 14. The link 14 also connects the terminal 10 to a programmable controller CPU 15, such as a PLC-5 TM programmable controller CPU, which in turn connects to associated remote and local I/O modules 16 in a manner understood by those of ordinary skill in the art.

I/O Node 1 connects to two inputs to sense the state of two input signals. I/O Node 1 also connects to four outputs. I/O Node 2 connects to one input and two outputs and I/O Node 3 connects to three inputs.

Figure 3:
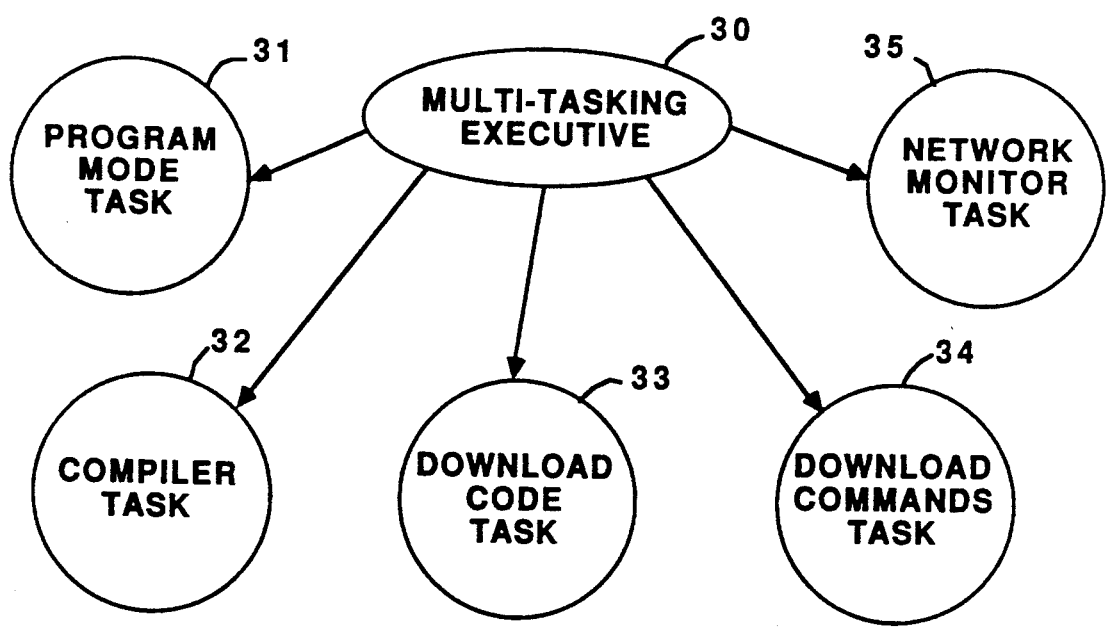
FIG. 3 is bubble diagram showing the programming elements for the computer of FIG. 1.

Using the programming terminal 10, a table editor is called up and executed during a PROGRAM mode task 31 seen in FIG. 3. Using configuration routines, alphanumeric tag labels for input and output variables are assigned to the physical inputs and outputs connected to the I/O nodes as shown in Tables 1 and 2 below.

TABLE 1

| Assignment of Variables to Outputs | | | | |
|---|---|---|---|---|
| Tag Labels | Node | Terminal | Type/Des. | Scan Rate |
| TANK_HOT_FILL | 1 | 2 | 2/4-20 MA | 80 msec |
| TANK_COLD_FILL | 1 | 4 | 2/4-20 MA | 80 msec |
| TANK_MIX | 1 | 10 | 3/24 VDC | 5 msec |
| TANK_DISCHARGE | 1 | 6 | 2/4-20 MA | 40 msec |
| MOTOR_LIFT_1 | 2 | 3 | 1/110 VAC | 10 msec |
| MOTOR_LIFT_2 | 2 | 4 | 1/110 VAC | 10 msec |

TABLE 2

| Assignment of variables to Inputs | | | | |
|---|---|---|---|---|
| Tag Labels | Node | Terminal | Type/Des. | Scan Rate |
| LIFT_TOP_LMT | 1 | 8 | 11/24 VDC | 5 msec |
| LIFT_BOTTOM_LMT | 1 | 9 | 11/24 VDC | 5 msec |
| SHUTTLE_REST | 2 | 8 | 11/110 VAC | 20 msec |
| TANK_LEVEL | 3 | 2 | 12/4-20 MA | 40 msec |
| CRANE_HIGH | 3 | 8 | 12/24 VDC | 5 msec |
| CRANE_LOW | 3 | 9 | 11/24 VDC | 5 msec |

The input and output variables are associated with I/O Nodes 1, 2 and 3 and specific terminal locations as seen in Tables 1 and 2 above. In addition, the input or output type is entered along with a variable update or scan rate. Type "4-20- MA" is current loop type of device operating in the range of 4-20 milliamps. Type "24 VDC" is a 24-volt DC discrete type of device. The update or "scan rate" is the rate at which inputs and outputs should be updated relative to an image table 20 of input and output status data, which is maintained in memory 17 in the programming terminal 10.

The data in Tables 1 and 2 is stored in the memory 17 of the programming computer 10 in tables 18 which are accessible by a COMPILER task 32, to be discussed later in this description.

Using additional configuration routines, certain parameters concerning the capacity of the I/O nodes are entered in the programming computer 10 and displayed on the screen for editing. These parameters are summarized in Table 3.

TABLE 3

| Node Descriptions | | | | |
|---|---|---|---|---|
| Node | Description | Control Type | Memory Size | Instruct. Type |
| 1 | 8051 | 10 | 4k/2k | assembly |
| 2 | 8051 | 12 | 8k/2k | assembly |
| 3 | 8051 | 0 | 0k/2k | none |
| 15 | PLC5/25 | 16 | 48k/8k | PLC |
| 10 | T-60 | 24 | 8M/64k | none |

Table 3 describes the computational capability of a node: e.g. processor type such as 8051, control type (the function of the program instructions which are stored), the size of the program memory, the RAM storage space and the type of program instructions accepted (e.g. assembly language). The size of the program memory and the RAM storage space is shown in the fourth column. Note that there are 4k of RAM and 2k of ROM on I/O Node 1, 8k of RAM and 2k of ROM on I/O Node 2 and 0k of RAM and 2k of ROM on I/O Node 3. The programmable controller 15 includes 48k of RAM and 8k of PROM. The programming computer 10, designated T-60, includes 8 megabytes of RAM and 64k bytes of PROM. The instruction type in column 5 of Table 3 refers to the type of control instructions by which the processor such as 8051 or PLC-5 is programmed. Note that I/O Node 3 has no external PROM and cannot be programmed to execute control functions; it is programmed only to read data from its inputs and execute communication functions on the network.

The information in Table 3 is stored in the memory of the programming computer 10 in table 19 which is accessible by a COMPILER task 32 to be discussed later in this description.

Referring again to FIG. 1, the programming terminal 10 and the I/O nodes 11, 12 and 13 are provided with software and hardware for operating a network with two modes of communication: 1) a first messaging mode for downloading compiled code 36 or configuration data to the I/O nodes 11, 12 and 13 and 2) a time-division multiplexing mode for broadcasting input data messages 25 to all nodes on the network.

Figure 2:
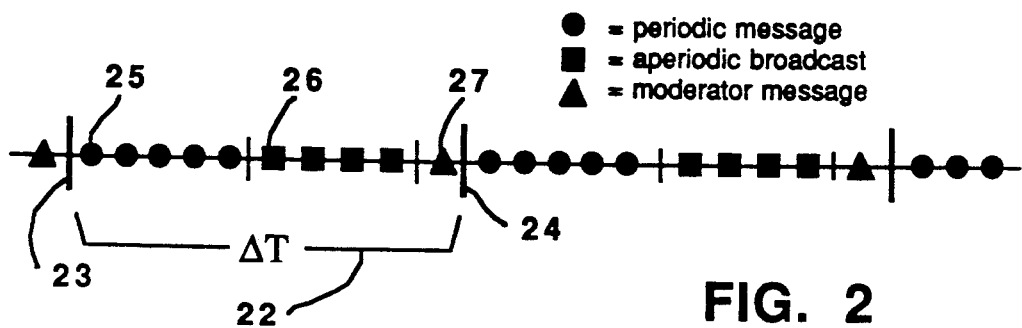
FIG. 2 is a time line diagram of the operation of the network of FIG. 1.

Network communication on the serial communication link 14 is designed to exhibit a repetitive pattern such as shown in FIG. 2. There, a ΔT minor cycle 22 begins at a first moderator tone 23 and extends until the next moderator tone 24. One portion of the minor cycle 22 is reserved for broadcasts of periodic messages 25 with status data or variables from each node, while the remaining time may be used for one or more aperiodic messages 26 from any node. After the time for aperiodic time messages 26 has expired, there is moderator time slot in which a moderator or synchronization message 27 is sent from a designated node, such as terminal 10 to the other network nodes 11-15. This moderator message 27 causes the next tone 24 to be generated in each node.

The network nodes, including elements 10-15 in FIG. 1, each include network software and hardware to ensure that each new minor cycle 22 will be synchronized. If a pending message is too long and would overlap into the next minor cycle 22 it is simply aborted and retransmitted in the next message slot.

During the preparation and downloading of programs, aperiodic messages 26, as seen in FIGS. 1 and 2, are used to convey compiled information to the I/O nodes 11, 12 and 13. When the I/O nodes 11, 12 and 13 are operating under control of this downloaded logic, inputs are broadcast in periodic messages 25 as illustrated in FIGS. 1 and 2.

Input data for all variables are not necessarily broadcast in every minor cycle 22. A string of minor cycles 22 in which the slowest periodic variable appears one time is called a major cycle.

FIG. 3 shows the organization and functions of the software in the terminal 10. Besides a DOS operating system, there is multi-tasking executive program 30 that is installed as part of the software. This executive program 30 schedules certain tasks to run. A PROGRAM task mode 31 runs when the terminal 10 is operating in a PROGRAM mode to enter and edit a programmable controller program 21 seen in FIG. 1. The program is comprised of graphical instructions in one of the known programming languages, such as ladder diagram, sequential function chart or function block diagram. After the program 21 has been entered, a COMPILER task 32 is executed to compile and subdivide the program 21 into pieces that can be distributed to the respective I/O nodes 11-13 and 15.

For example, a ladder diagram program may be subdivided on a rung-by-rung basis with one or more compiled rungs being distributed to a particular I/O node 11. In FIG. 1, one portion of the compiled code 36 that pertains to the output labeled TANK_HOT_FILL is being downloaded to I/O node 1. Another portion of the compiled code 37 that pertains to MOTOR_LIFT_1 is later downloaded to I/O Node 2. The downloaded code is installed at I/O Node 1 and I/O Node 2 to relate inputs (connected anywhere on the network) to outputs at I/O Nodes 1 and 2, respectively.

Figure 4:
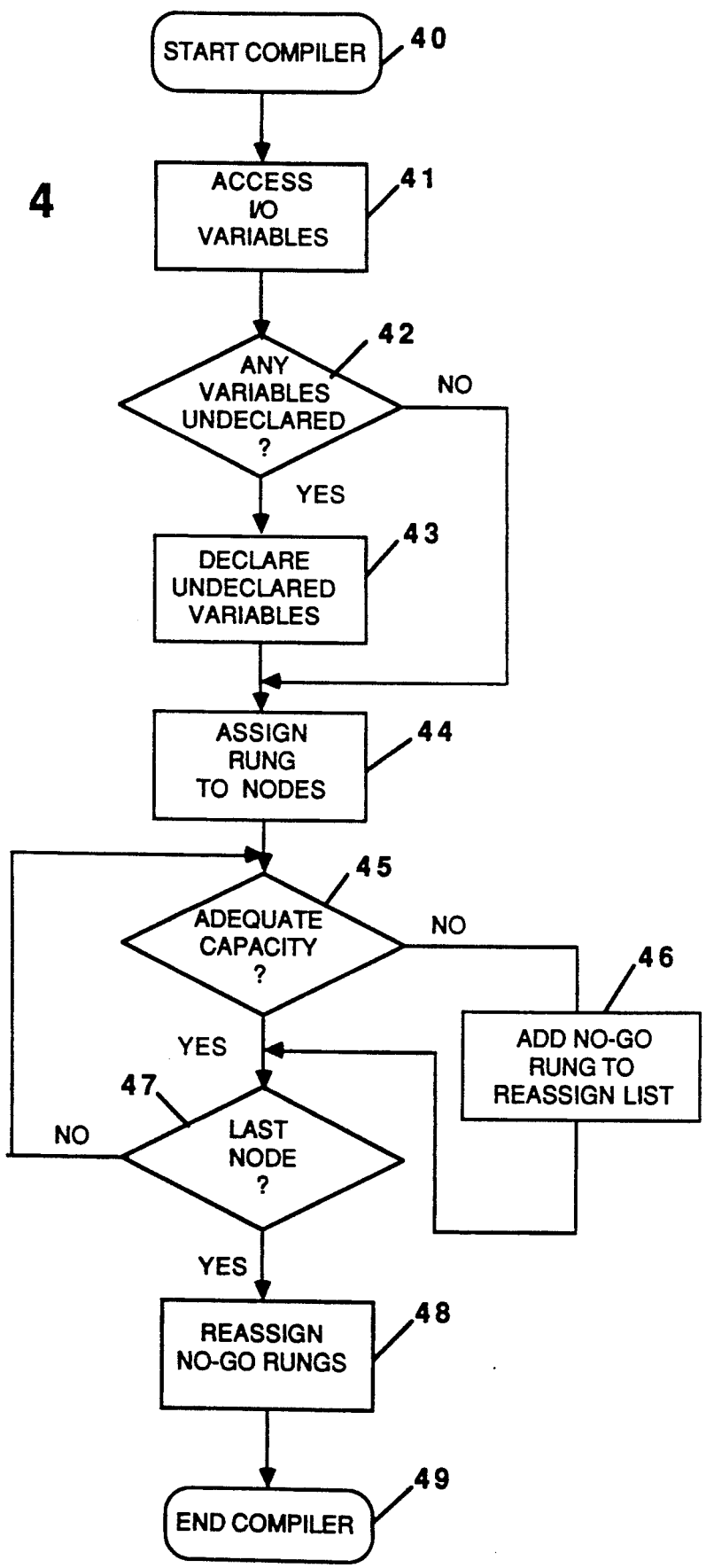
FIG. 4 is a flow chart for the compiler task represented in FIG. 3.

Referring to FIG. 4, the beginning of execution of the COMPILER task 32 is represented by start block 40. After startup of the compiler, the I/O variables set up in the tables 18, 19 in memory 17 are accessed as represented by process block 41. As represented by decision block 42, a check is made to determine whether any variables have been left undeclared (unassigned or undefined). If undeclared variables are detected, prompt messages are shown on the computer screen to prompt the user to declare these variables, as represented by process block 43. Next, as represented by process block 44, instructions are executed to assign rungs of a ladder diagram program to respective nodes based on the output in the rung.

For, example the rung 21 in FIG. 1 might include: 1) an XIC (-||-) instruction to test whether TANK_LEVEL input at Node 3 is "ON" and 2) an OTU instruction to unlatch and turn off the cold water controlled by outputs labeled TANK_COLD_FILL at Node 1. The compiled logic 36 (FIG. 1) for this rung is loaded into a message 26 for distribution to Node 1. Node 1 would receive input status data when Node 3 broadcasts its inputs over the serial data link 14 in a periodic broadcast message 25.

Similarly, compiled rung logic 37 for outputs at Node 2 would be downloaded to Node 2, and Node 2 would receive input status data for this rung either during the first periodic broadcast message 25 or in a subsequent periodic broadcast message 25. In this example, Node 3 has only inputs, so no logic would be downloaded to it.

Referring again to FIG. 4, after the rungs have been assigned during the compiler process, a check is made, as represented by decision block 45, to see if the I/O nodes have adequate processing capability to execute the rung. If not, the rung is added to a no-go rung list for reassignment to another node, as represented by process block 46. The rung could also be tested for operation at another node or transferred by a variable that relates one node to a physical output at the other node. The loop back to block 45 is repeated until the last node is detected in decision block 47. After this occurs, the program sequence proceeds to process block 48, where the no-go rungs are reassigned to other I/O nodes. This ends the COMPILER task 32 as represented by END COMPILER block 49.

Referring to FIG. 3, a DOWNLOAD CODE task 33 is executed in response to a DOWNLOAD command entered through the terminal 10 by mouse or keyboard to transfer portions of the subdivided program to the respective I/O nodes 11-15. This DOWNLOAD task 33 causes data files including downloadable logic to be set up for transmission on the link 14 in aperiodic messages 26. Besides downloading the rung logic, aperiodic messages 26 will also transmit scan rate parameters, so that the I/O nodes 11, 12 and 13 know how often to broadcast their inputs. Inputs are broadcast to the terminal 10, even if only needed for control functions at their node of origin. This allows the terminal 10 to maintain an image table of I/O status data 20 for conditions on the entire system. As shown in FIG. 3, a NETWORK MONITOR task 35 is executed to read all inputs broadcast on the link 14 and to maintain the status and diagnostic condition for all inputs on the system in the image table 20 in memory 17.

The update or scan rate is sometimes the result of combining scan rates for several inputs. For example, if an input is required by several outputs at scan rates varying from 5 msec to 80 msec, the broadcast rate will equal the shortest scan rate of 5 msec.

Referring again to FIG. 3, a DOWNLOAD COMMANDS task 34 is executed to load remote commands into aperiodic messages 26 to the I/O nodes. Such commands include START and STOP commands to start and stop execution of downloaded logic commands, to overwrite with new downloaded logic, diagnostic commands and other commands apparent to those of ordinary skill in this art. In response to aperiodic command messages 26, reply messages are sent to the terminal 10 to trigger display of visual diagnostic messages to an operator.

Figure 5:
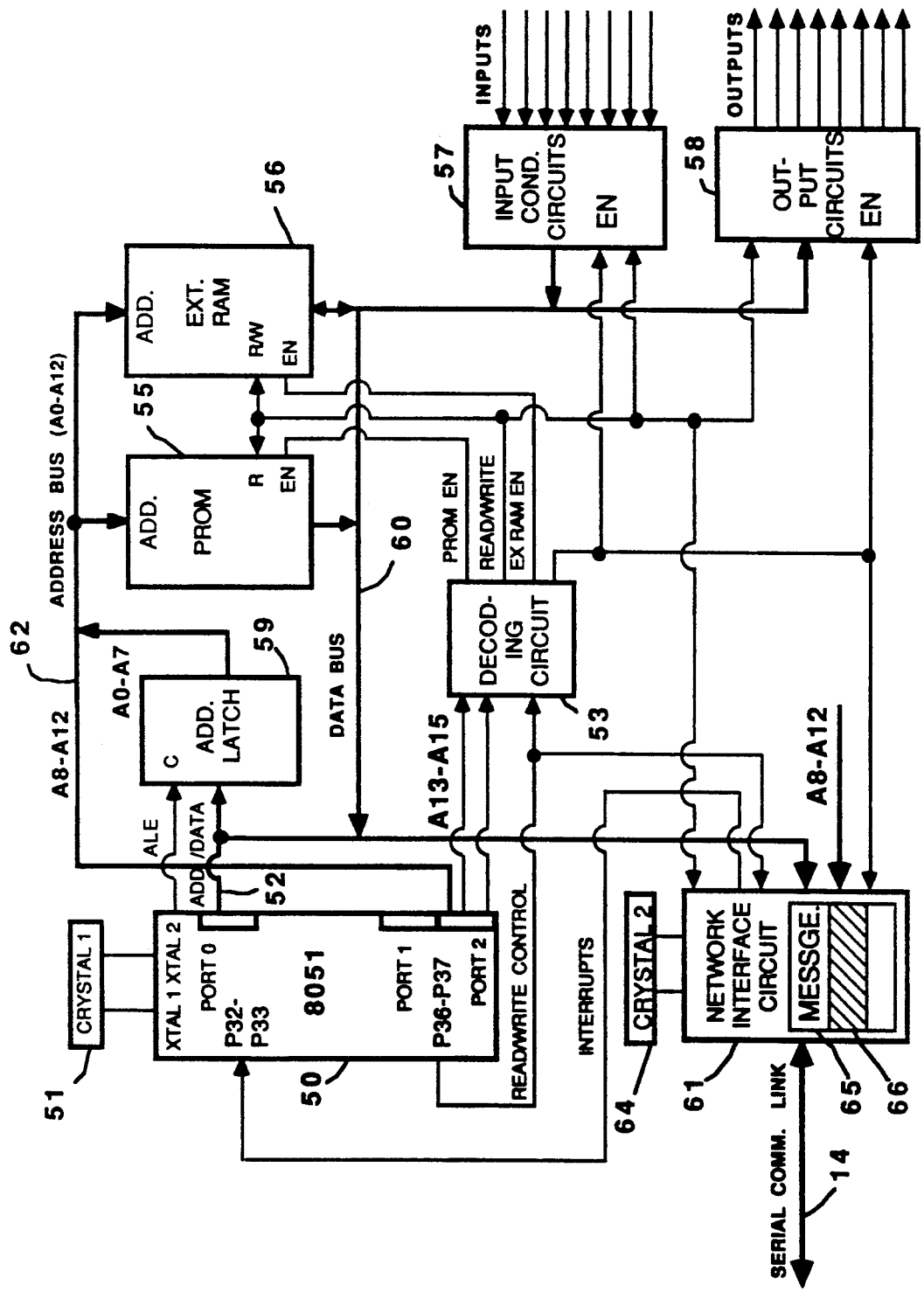
FIG. 5 is a block diagram of an I/O node of FIG. 1.

FIG. 5 illustrates the hardware for the I/O nodes 11, 12 and 13. A microelectronic processor 50 is preferably a Model 8051 microcomputer manufactured by Intel Corporation, Santa Clara, Calif. For information on the architecture, operation and programming of this circuit, reference is made to the commercial literature for this circuit which is available from Intel Corporation and its distributors.

In this embodiment, a crystal 51 is connected to the XTAL 1 and XTAL 2 inputs to provide a suitable clock frequency for operation of the processor 50. The processor 50 has I/O PORTS 0-3. I/O PORT 0 provides multiplexed outputs so that eight bits of data (D0-D7) and a lower eight bits of address (A0-A7) can be transmitted over a single eight-bit multiplexed bus 52 having lines (AD0-AD7). The address bits are latched in address latch 59, while the higher address bits A8-A12 are transmitted from I/O Port 2. An ALE line is connected to the address latch 59 and carries a signal to enable latching of the address bits A0-A7.

I/O PORT 2 provides the upper eight bits of address (A8-A15). Lines A8-A12 are used for addressing memory and registers in the network interface circuit 61, while lines A13-A15 are decoded by decoding circuitry 53 to enable the various circuits 55-58, 61 through enable lines. The functions of the terminals in I/O PORT 3 include RECEIVE and TRANSMIT interrupt signals received at terminal P32-P33 and READ and WRITE output control signals transmitted from terminals P36 and P37.

The processor 50 reads bytes of input status data through the data bus 60 from a group of eight input conditioning circuits 57. These circuits 57 are connected to the actual input devices and convert digital or analog signals to signals of proper signal level for data processing. These circuits 57 also isolate the electronic circuitry in the I/O Node from the devices on the machine or process being controlled. Input circuits suitable for this purpose are disclosed in Dodds et al., U.S. Pat. No. 4,972,365, issued Nov.20, 1990.

The processor 50 is also connected through the data bus 60 to a bank of output circuits 58 including an 8-bit latch and output isolation and signal-level converting circuitry. These circuits 58 connect to the output devices on the machine or process being controlled. Output circuits suitable for this purpose are disclosed in Dodds et al., U.S. Pat. No. 4,972,365, issued Nov. 20, 1990.

The processor 50 performs its functions by executing a program of machine-language instructions which are stored in a programmable read-only memory (PROM) 55 with a capacity 2k bytes or more of instructions and constants. The processor 50 stores working data and data that it is being communicated with the terminal 10 in an external RAM 56 (random access memory) with a capacity of 4k to 8k bytes of information (see Table 3 above). I/O Node 3 is not provided with a RAM 56. The processor 50 also has 128 bytes of internal RAM for use as working registers.

To address the PROM 55 and the RAM 56, the multiplexed bus 52 is connected to address inputs on the PROM 55 and RAM 56 through an address latch 59. When address information is present on the multiplexed bus 52, the microelectronic processor 50 transmits an address latch enable (ALE) signal to capture the address information in the latch 59, where it is held at the outputs as data is transmitted on the data bus 60. In addition, address lines A8-A12 are connected to corresponding address inputs on the RAM 56 and address lines A8-A10 are connected to corresponding address inputs on the PROM 55 to provide the higher order bits of address.

Information can be sent in either direction on the data bus 60, except that machine-language program information the PROM 55 can only be read.

The microelectronic processor 50 must also selectively enable various circuits to read and write information. To do this, its read and write control lines and three high order address lines A13-A15 are connected as inputs to a decoding circuit 53 that generates read/write and enable signals. A signal on the PROM EN line activates the PROM 55 and a read signal on the READ/WRITE line causes information to be read from the addressed location. Similarly, a signal on the EX RAM EN line activates the external RAM 56 and a read signal on the READ/WRITE line will cause information to be read from the addressed location of the RAM 56. A write signal on the READ/WRITE line will cause information to be written to the addressed location of the external RAM 56.

The network interface circuit 61 is an integrated circuit that includes a modem section that combines receiver, transmitter and data encoding/decoding circuitry; error checking circuitry; FIFO memories for receiving and storing message data; timers, counters and control/status registers for controlling transmission and reception on the serial data link 14, and registers 65 for transferring network data to the 8051 processor 50. The network interface circuit may use a second crystal oscillator 64 to derive its own timing signals independent of the microprocessor 50. A second network interface circuit (like circuit 61 but not shown) is included in the programming terminal 10 and is electrically connected to another end of the link 14.

Both the aperiodic and periodic messages 25 and 26 are received and transmitted on the serial link 14 in message frames which are organized as follows:

preamble|start delimiter|source add.|DATA PACKET |error code| end delimiter|

The DATA PACKET field 66 may contain several data packets each organized as follows:

|data pkt.length|control bits|data tag|DATA|

Configuration data is received by the network interface circuit 61 from both the processor 50 and the serial data link 14. When the processor 50 sends configuration data to the network interface circuit 61, it is also transmitted on the serial data link 14. At the same time, it is executed in the network interface circuit 61 as if it was received from the serial data link 14.

Through aperiodic messages 26, the network interface circuit 61 is configured to recognize and process only those messages on the link 14 with certain tag names. The circuit 61 receives messages 65, strips off network control fields and sets up the DATA PACKETS 66 for transfer to the microprocessor 50. It then signals the processor through one of the interrupt lines that data is ready for transfer.

The microprocessor 50 then reads the data from the network interface circuit 61 and if output status data is present, it will later transfer this to the output circuits 58 to control the output devices on the controlled system. The microprocessor 50 also executes the downloaded ladder logic to read inputs and control outputs on a local basis at its own I/O node.

Based on the scan rate, which the 8051 processor has previously received in an aperiodic message 26, the processor 50 reads input data from the input circuits 57 and updates registers in the network interface circuit 61 for broadcast to the other nodes 10-15.

The microprocessor 50 performs a DMA (direct memory access) type of transfer to move DATA PACKETS 66 to FIFO's in the network interface circuit 61. These DATA PACKETS may vary slightly from the format described above, but generally, they include control bits, data tags and the input status or other data to be transmitted. The network interface circuit then processes DATA PACKETS 66 for transmission in aperiodic or periodic messages 65 according to network transmission criteria.

The timers and control circuits in the network interface circuit 61 operate in each I/O node 11, 12 and 13 to broadcast at least one periodic broadcast message 25 in each major cycle. Timers and control circuits in a network interface circuit in the programming terminal 10 operate to send a moderator message 27 at the end of each minor cycle 22.

This description has been by way of an example of how the invention can be carried out. Those with knowledge in the art will recognize that various details may be modified in arriving at other detailed embodiments, and that many of these embodiments will come within the scope of the invention. Therefore to apprise the public of the scope of the invention and the embodiments covered by the invention the following claims are made.

We claim:

1. A method of distributed logic processing for operation through a network having a logic programming node which connects through I/O nodes to a plurality of inputs on a controlled system the inputs having logic states, and which connect to a first I/O node for operating a first output on the controlled system and which connects to a second I/O node for operating a second output on the controlled system, the method comprising the steps of:

within the logic programming node, translating a control program from a higher-level logical programming language into an executable logic, wherein the control program logically relates the first and second outputs to the logic states for inputs communicating with the network;

automatically subdividing the executable logic into a first portion corresponding to the first output controlled at the first I/O node, and a second portion corresponding to the second output controlled at the second I/O node;

communicating the first portion of the executable logic through the network for execution within the first I/O node to operate the first output in response to the logic states for logically related inputs;

communicating the second portion of the executable logic through the network for execution within the second I/O node to operate the second output in response to the logic states for logically related inputs; and transmitting through the network to the first and second I/O nodes the logic states for the plurality of inputs, wherein each I/O node responds to the logic states for logically related inputs to control a respective one of the outputs connected to that I/O node.

2. The method of claim 1, wherein the communicating step includes operating the network in an aperiodic messaging mode to communicate the first and second portions of the executable logic from the programming node to the first and second I/O nodes, respectively.

3. The method of claim 2, wherein the transmitting step includes operating the network in a synchronized, time-division broadcasting mode to communicate the logic states for the plurality of inputs to the first and second I/O nodes.

4. The method of claim 2, wherein, the transmitting step includes operating the network in a synchronized, time-division broadcasting mode to communicate the logic states for the plurality of inputs to the logic programming node; and further comprising the step of updating in the logic programming node input status data and output status data for all I/O nodes on the controlled system.

5. The method of claim 4, further comprising the step of updating in the logic programming node a current state for the control program.

6. The method of claim 1 wherein the higher level language is a ladder diagram with rungs identified to outputs; and where the step of automatically subdividing the executable logic separates the executable logic on a rung-by-rung basis according to the rung's output so as to create the first portion corresponding to the first output controlled at the first I/O node and the second portion corresponding to the second output controlled at the second I/O node.

* * * * *